April 17, 1934.   H. C. SNOW ET AL   1,955,103
AUTOMOTIVE DIFFERENTIAL GEARING
Filed June 5, 1931   3 Sheets-Sheet 1

Inventors
Herbert C. Snow
and G. W. Harper
By Arthur M. Nelson
Attorney.

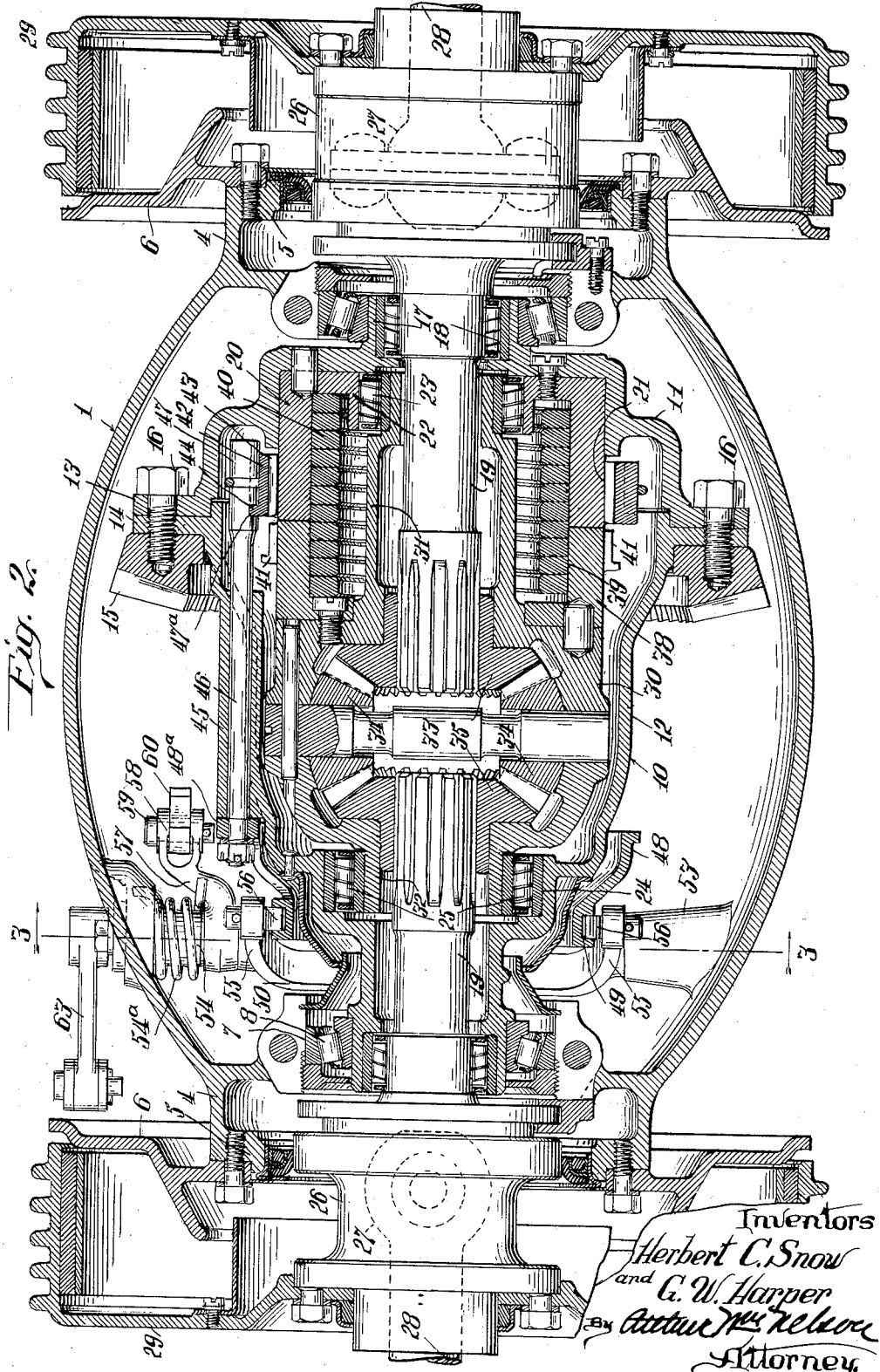

April 17, 1934.  H. C. SNOW ET AL  1,955,103
AUTOMOTIVE DIFFERENTIAL GEARING
Filed June 5, 1931  3 Sheets-Sheet 3
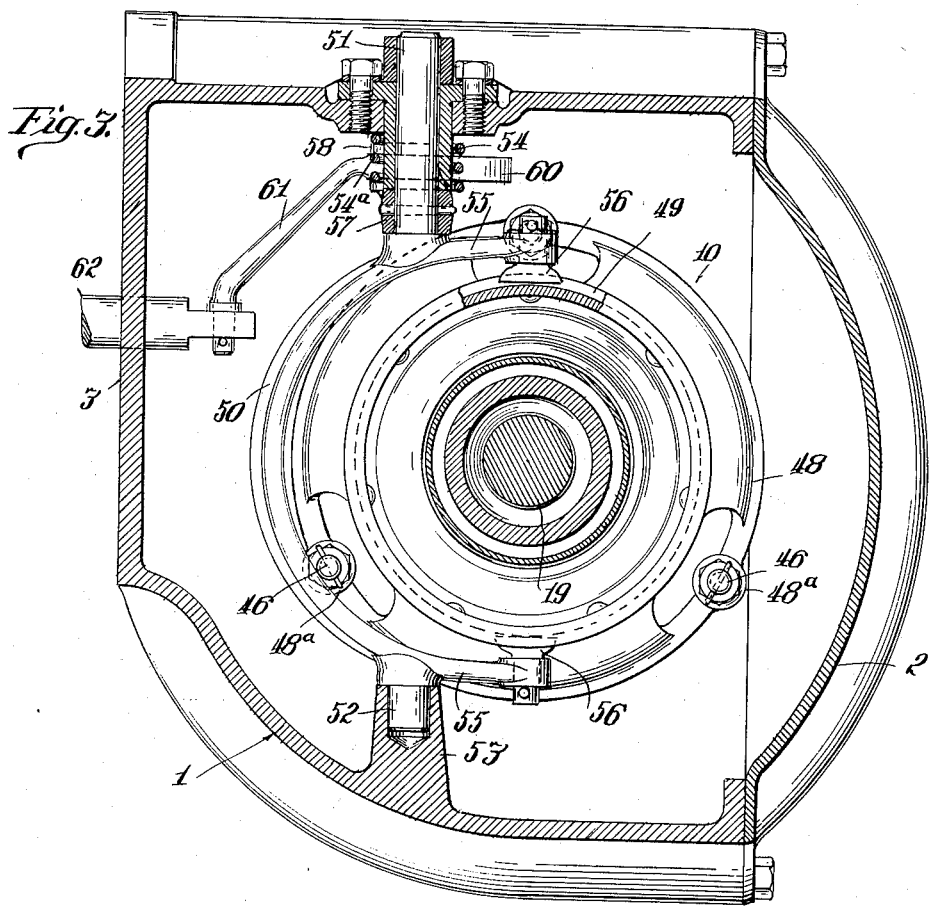
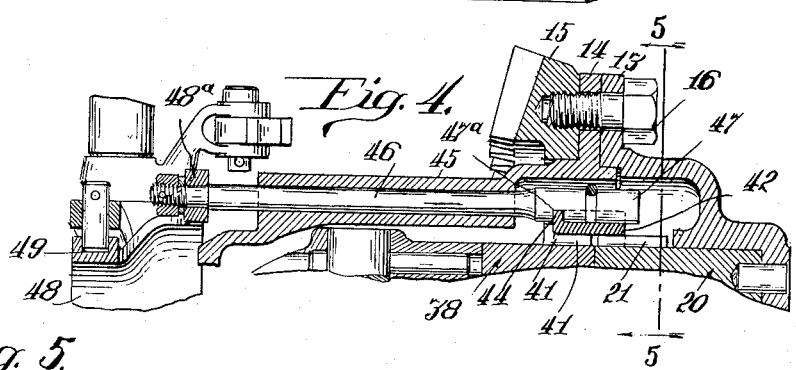
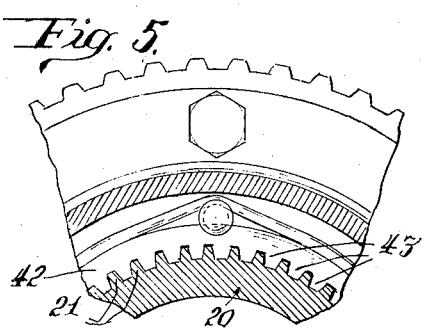
Inventors
Herbert C. Snow
and G. W. Harper
By Arthur Wm Nelson
Attorney Patented Apr. 17, 1934

1,955,103

UNITED STATES PATENT OFFICE 1,955,103

AUTOMOTIVE DIFFERENTIAL GEARING

Herbert C. Snow, Auburn, Ind., and George W. Harper, Cleveland, Ohio, assignors to Manning & Company, Chicago, Ill., a corporation of Illinois Application June 5, 1931, Serial No. 542,206

15 Claims. (Cl. 74—99)

This invention relates to improvements in automative differential gearings and it consists of the matters hereinafter described and more particularly pointed out in the appended claims.

The primary object of the invention is to provide a gearing of this kind especially adapted for front drive automobiles and which gearing includes parts providing free wheeling in any of the forward change speed gear ratios of the associated transmission, with said parts so formed and correlated with respect to the other parts of the gearing as to in no manner require an increase in the overall dimensions of said gearing.

Another object of the invention is to provide a gearing of this kind, which is quiet in operation and especially so when free wheeling, thus eliminating gear hum in the differential because the gears thereof are then rotating at engine idling speed and not at car speed.

Still another object of the invention is to provide a gearing of this kind wherein the free wheeling action may be locked out when desired and which locking out is automatic when it is desired to drive the car in reverse.

The above mentioned objects of the invention as well as others, together with the many advantages thereof will more fully appear as we proceed with our specification.

In the drawings:—

Fig. 2 is a vertical longitudinal section through the same as taken on the line 2—2 of Fig. 1.

Fig. 3 is a transverse vertical section through the same as taken on the line 3—3 of Fig. 2.

Fig. 4 is a fragmentary longitudinal sectional view of parts shown in Fig. 2, with certain ones thereof in a changed relation.

Fig. 5 is a detail transverse vertical sectional view as taken on the line 5—5 of Fig. 4.

Figure 1:
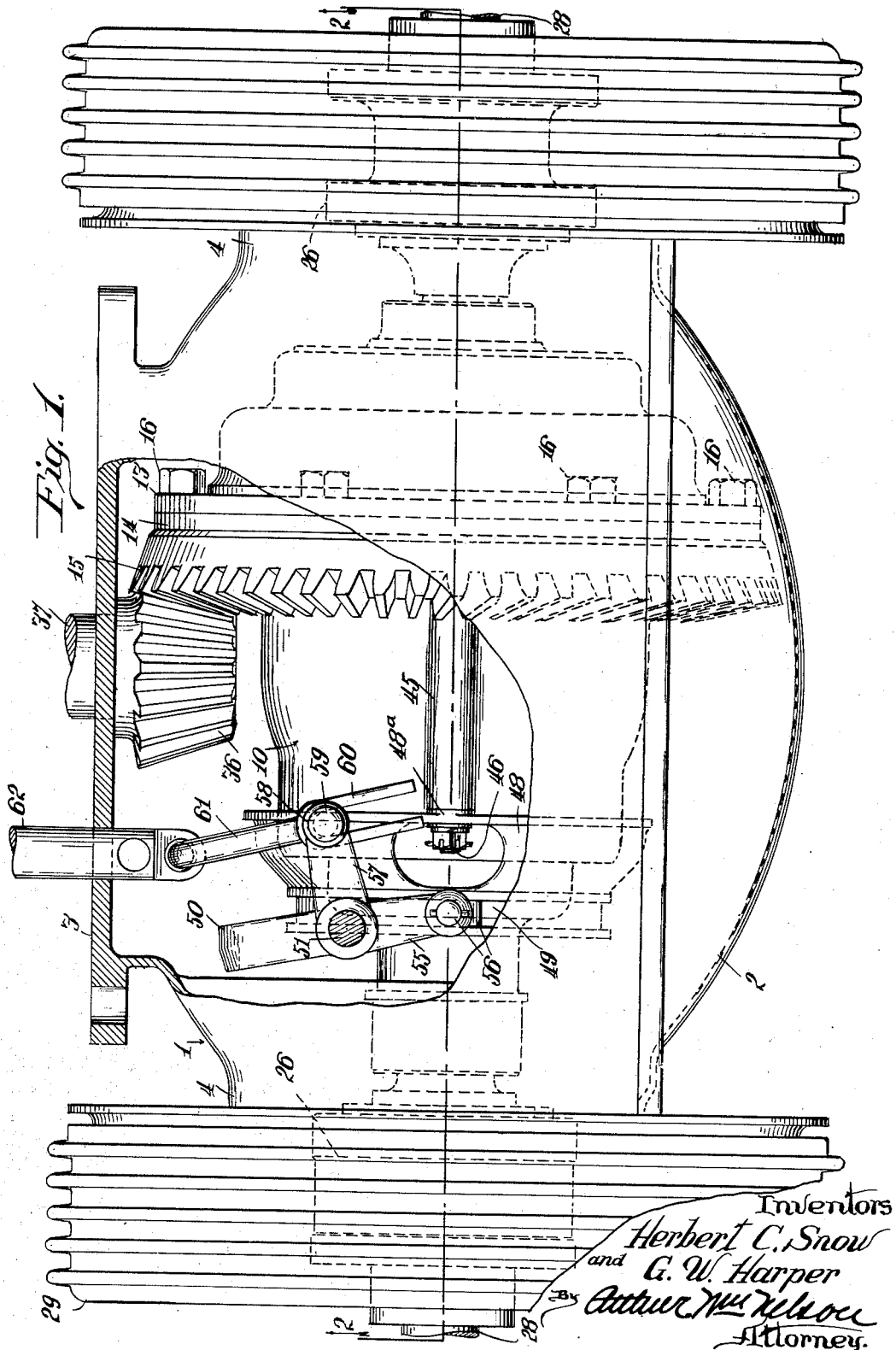
Fig. 1 is a top plan view of a differential gearing for front driven automobiles embodying our invention with parts broken away to more clearly illustrate the invention.

The invention is herein illustrated and described as embodied in a differential for a front drive car but as will be apparent, it may also be embodied in differentials for other kinds of cars, where the peculiar characteristics of the invention make it of advantage to do so.

The differential is conventional in many respects and in general, includes the usual casing formed at its ends to provide supports for the bearings for the reduced end parts of the housing or cage carrying the ring gear. Within said housing is located the spider carrying certain of the pinions of the differential and said spider is journalled in suitable bearings associated with the housing or cage. The other pinions of the differential are secured to the driven shafts of the differential and which shafts are in turn journalled in bearings carried by the housing or cage.

To one side of the pinions, the spider is provided with an annular clutch member which coacts with a similar member fixed to the cage to provide a pocket to receive a clutch spring. Both of these members have external splines or teeth, and an internally splined ring is associated with said members so as to be shiftable to connect said members together regardless of the clutch spring.

In the casing, to the other side of the differential pinions is mounted a yoke having arms engaged in a groove of a shifter ring. To this ring are secured rods that have a sliding bearing in bosses on the housing and are connected to the splined ring associated with the clutch members.

The yoke mentioned includes an actuator arm operatively connected with a lost motion arrangement with the first and reverse shift rod of the associated transmission so that when said transmission is set for "reverse" the free wheeling or overrunning clutch is locked out of action. Also, connected to said yoke is still another arm whereby the clutch may be locked out in any of the forward speeds regardless of the action of the first and reverse shift rail, thus requiring a positive action on the part of the operator to again bring the free wheeling action into operation for any of the forward speeds.

Referring now in detail to that embodiment of the invention illustrated in the drawings:— 1 indicates as a whole the casing of the differential of conventional and somewhat elliptical form when considered in section from end to end. Said casing is open at its front and rear sides and the open front side is provided with a cover 2 while the open rear side is made substantially flat as at 3 for a bolted on engagement with the end of an associated transmission.

Each end 4 of the casing is made tubular, and of a reduced diameter and terminates in an inturned radial flange 5 to which a brake backing plate 6 is securly bolted. A short distance inwardly from said flange 5, each end 4 is provided with a seat 7 for a roller bearing 8 the purpose of which will presently appear.

10 indicates the housing or cage of the differential, preferably made of a pair of tubular members 11 and 12 respectively having matched radial flanges, 13 and 14 respectively, disposed to one side of the perpendicular transverse plane of the casing. These flanges provide a seat for the ring gear 15 of the differential and bolts 16 not only secure said flanges together but also secure said ring gear in place thereon.

Each tubular member 11 and 12 have end parts or extension 17 of reduced diameter that operatively engage the bearings 8 before mentioned and in each end part or extension is located a bearing 18 for a part of the associated driven shaft 19 of the differential. Pinned in the housing or cage member 11 is a tubular clutch member 20 that includes external spline like teeth 21 at its inner end and an inwardly extending radial flange 22 at its outer end to receive a bearing 23.

The housing or cage member 12 is provided at a point between its ends with a seat 24 for a bearing 25 which is in effect a companion with respect to the bearing 23 just above mentioned.

Each driven shaft 19 of the differential is provided at its outer end with a cup like enlargement 26 formed for a universal slip joint connection 27 for the associated wheel driving shaft 28. Secured to each cup like enlargement 26 is a brake drum 29 associated with the backing plate 6 before mentioned. In said drum and mounted on the backing plate are the usual brake elements but as they form no part of the present invention it is not thought necessary to illustrate or describe the same.

Within the housing or cage 10 is located a spider 30 formed at itse ends with tubular extensions 31—32 for engagement in the bearings 23 and 25 previously mentioned. Said spider carries a transverse shaft 33 upon which and within the spider is mounted a pair of facing pinions 34. These pinions mesh with facing pinions 35 splined on the inner ends of the shafts 19. The shaft 33 is disposed in a plane to one side of that of the ring gear 15 and in said plane and extending into the casing 1 from its rear side 3 is a pinion 36 that meshes with the ring gear 15. Said pinion is secured on the end of the driven shaft 37 of the transmission so that it is apparent the pinion 36 will drive the ring gear.

Suitably secured to the spider 30 is a tubular clutch member 38 which is of the same diameter as that of the clutch member 20 and which it meets end to end. Said clutch members coact to provide a clutch pocket or recess 39 to receive a clutch spring 40 which is fixed at one end with respect to one of said clutch members and is loose at its other end with respect to the other clutch member. On the outer end of the clutch member 38 are provided spline like teeth 41 which match up with the teeth 21 on the clutch member 20. A shifter ring 42 is associated with said clutch members and has internal spline like teeth 43 to match those on said clutch members and on the inner end of said ring is a radially outwardly extending flange 44.

Normally the ring 42 surrounds only that portion of the clutch member 20 defined by the length of its teeth 21. When in this position, the clutch members 20 and 38 are relativley rotatable in one direction. However, when said ring is shifted axially in the proper direction, it will bridge the meeting ends of the clutch members and through the various spline like teeth mentioned, will lock said clutch members together regardless of the relative direction in which they are rotated.

In the housing part 12 is provided a plurality of longitudinally extending bosses 45 in each of which a shifter rod 46 has sliding guiding bearing. That end of each rod associated with the ring 42 is provided with a head 47 in which is formed a transverse slot 47a to engage the flange 44 of the ring 42. The other end of each rod 46 is secured in an associated ear 48a formed on the inner end of a collar 48, that surrounds the associated part of the housing part 12 and in the outer end of said collar, which is reduced in diameter, is an external annular groove 49. It is apparent from the above, that when an endwise movement is imparted to the rods 46 in either direction, a like movement is imparted to the shifter ring 42.

Disposed in that end of the casing in which the collar 48 is located, is a yoke 50, provided with perpendicularly extending, top and bottom studs 51 and 52 respectively, disposed in a plane spaced from the longitudinal median plane of the casing and toward the rear side thereof. The bottom stud 52 bears in a boss 53 rising from the bottom wall part of the casing, while the top stud 51 bears in and projects a suitable distance beyond a bushing 54 removably secured in a top wall part of the casing. The free ends of the yoke terminate in top and bottom arms 55 that extend beyond the plane of the studs 51—52 to terminate substantially in the longitudinal median plane of the casing 1. Each arm 55 is provided at its free end with a pin or stud 56 and both studs extend into the groove 49 of the collar 48 at diametrically opposite, top and bottom points therein.

Fixed to the top stud 51 between the top arm 55 and the bushing 54 is an arm 57 having a bifurcated free end 58 carrying a vertically disposed pin 59. Said bifurcated ends of said arms, receive between them so as to engage the pin thereof, the bifurcated end 60 of a link 61 that is pivotally connected at its other end with the end of the low and reverse gear, shift rod 62 of the associated transmission. A spring 54a surrounding the bushing 54 and anchored at one end in the casing 1 and anchored at its other end in the arm 57, normally acts to hold the yoke 50 in that position wherein free wheeling is possible as shown in Fig. 2. On that end of the stud 51 above the bushing 54 outside the casing 1 is secured an arm 63 which may be actuated in any suitable manner to impart a rocking movement to the yoke independent of the shift rod 62. Preferably a Bowden wire control (not shown) is secured at one end to the arm 63 and leads to the instrument board of the automobile within convenient reach of the operator, for actuating the arm 63 against the action of the spring 54a.

Assume that the parts are in the position shown in Fig. 2 wherein the ring 42 is associated with and is surrounding only that part of the clutch member 20 having the teeth 21 thereon. Assume that the engine of the car is in operation and the transmission shift lever has been shifted to provide first speed forward. In this movement of the lever the rod 62 is shifted forwardly but because of the bifurcated part 60 of the link 61, a lost motion is provided whereby the position of the yoke 50 is in no manner affected. When in first speed forward, the pinion 36 will drive the ring gear 15 which of course, drives the differential housing 10 comprising the parts 11 and 12. As the clutch part 20 is fixed with respect to the housing part 11, said clutch part will rotate with the housing.

In the rotation of the clutch part 20, relative to the clutch part 38, the spring 40 is unwound and is caused to radially expand and grip against the clutch surface 39 and thus clutch the members 20 and 38 together. As the clutch member 38 is secured to the pinion spider 30, it is apparent that said spider rotates with the ring gear housing and this through the pinions in the spider, will drive the shafts 19 which in turn will drive the wheel driving shafts 28. The above operations also take place when the transmission has been manipulated to provide second and third speeds forward. Should one shaft 19 rotate faster than the other as when the car is turning a corner, this difference in rotation is accommodated by the relative movement of the pinions 34—35 as in any conventional type of differential.

When the car is descending a grade or the engine has been decelerated so that the shafts 19 tend to rotate faster than the housing 10 carrying the ring gear 15, the clutch part 38 will permit the spring radially to contract under the tension of its coils and if there is not sufficient tension therein said clutch part will act to wind up the spring 40 and radially contract the same. This releases the gripping action of the spring from the surface 39 so that the clutch members 38 and 20 are relatively declutched, whereby the spider and its clutch member can overrun the housing and its clutch member. As soon as the engine is again accelerated whereby the ring gear is again engine driven, the clutching action before described immediately occurs again to lock the two clutch members together.

It is apparent, if it is desired to drive the car in reverse, that means must be provided for locking the clutch members together, otherwise, with the ring gear driven in the other or reverse direction, the clutch member 20 would overrun the clutch member 38. When the transmission shift lever has been shifted into reverse, a movement of the shift rod 62 toward the differential casing occurs. In this movement of the shift rod, a like movement is imparted to the link 61 and as the pin 59 is engaged with the closed end of the bifurcated part 60 of the link, this acts through the arm 57 to rock the yoke 50 about its studs 51—52 in a clockwise direction.

As the studs 56 on the yoke arms 55 are engaged in the groove 49 of the collar 48, an endwise outward movement is imparted thereto and to the rods 46 carried thereby. These rods because of their engagement with the shifter or lock-out ring 42 will impart a similar movement to the ring to cause it to bridge the meeting ends of the clutch members 20 and 38 and lock them together as is best shown in Fig. 4. Thus the reverse rotation of the ring gear is transmitted to the shafts 19 as in conventional differentials.

In the shifting of the rod 62 back into neutral, through the usual shift lever of the transmission, the spring 54a before mentioned, operates upon the arm 57 so that the yoke 50 is rocked to return the ring 42 to the free wheeling position as shown in Fig. 2.

By means of the arm 63 and its actuator rod it is possible to lock-out the free wheeling action in any of the forward speeds, as it is sometimes desired as when the engine is to be used as a brake. Thus in the manipulation of the arm 63, to lock out the free wheeling action, the link 61 in no way interferes therewith because of the lost motion permitted by the bifurcated end thereof.

By disposing the free wheeling mechanism in the differential, a special advantage is gained in front driven automobiles. Such an arrangement saves length because every inch which is added between the differential and the main clutch adds that much to wheel base. With the free wheeling mechanism so located, a quieter transmission is possible when free wheeling, because of the absence of hum.

Again, with the free wheeling mechanism arranged in the differential, when the same is in action the beveled gears are not rotating at car speed but only at engine idling speed and this eliminates to a great extent the humming noise that arises in some conventional differentials while coasting and which are not equipped for free wheeling.

The parts are so disposed as to in no manner require greater dimensions in the casing itself and it is further pointed out that balance in the differential as a whole is maintained so that no vibration occurs.

While in describing the invention, we have referred in detail to the form, arrangement and construction of the various parts thereof, the same is to be considered as illustrative only, so that we do not wish to be limited thereto except as may be specifically set forth in the appended claims.

We claim as our invention:—

1. A gearing of the kind described embodying therein a driving member, driven shafts, a differential spider, differential speed providing means between said spider and shafts, means providing an overrunning clutch between said member and shafts and means for connecting said driving member and spider together for a positive driving connection in either direction and for rendering said overrunning clutch inoperative.

2. A gearing of the kind described embodying therein a driving member, driven shafts, a differential spider, differential speed providing means between said spider and shafts, means providing an overrunning clutch between said member and shafts and means operable to coact with parts of said overrunning clutch for locking out the overrunning action thereof and for providing a positive driving connection in either direction between said driving member and said spider.

3. A gearing of the kind described embodying therein a ring gear supporting member, driven shafts, a differential spider, differential speed providing means between said spider and shafts, means providing an overrunning clutch between said ring gear supporting member and said spider and means for connecting said supporting member and spider together for a positive driving connection in either direction and for rendering said overrunning clutch inoperative.

4. A gearing of the kind described embodying therein a driving member, driven shafts, a differential spider, gear and pinions connecting said driven shafts and spider, means located axially to one side of said gears and pinions providing an overrunning clutch between said driving member and spider and means axially shiftable of said shafts and cooperating with parts of the clutch to lock out the overrunning action thereof and to positively connect said driving member and spider together for a positive driving connection in either direction.

5. In a gearing of the kind described, a driving member, driven shafts, a differential spider, gear and pinions connect'ng said driven shafts and spider, means coacting with said spider and member respectively providing an overruning clutch therebetween and means operable through parts of said overruning clutch for positively connecting said spider and driving member together so that said member may drive the spider in either direction.

6. In a gearing of the kind described, a driving member, driven shafts, a differential sp'der, gear and pinions connecting said driven shafts and spider, means coacting with said spider and member respectively providing an overruning clutch therebetween and a collar shiftable axially of said shafts for positively connecting said differential spider and driving member together so that said member may drive the spider in either direction.

7. In a gearing of the kind described, a driving member, an axially arranged differential pinion spider, means on said member and spider respectively providing coacting clutch parts, means associated with said clutch parts and operating automatically in a relative rotation between said member and spider in one direction for clutching them together and means operable to connect said member and spider together for simultaneous rotation in either direction independent of said means associated with said clutch parts.

8. In a gearing of the kind described, a driven housing, a differential pinion spider axially in said housing, means at one end of the housing and on an associated part of said spider providing coacting clutch members, a clutch spring in said coacting clutch members for clutching them together in a relative rotative movement in one direction and means surrounding said coacting clutch members and longitudinally shiftable thereon for connecting said clutch members together independent of said spring.

9. In a gearing of the kind described, a driven housing, a differential pinion spider axially in said housing, means at one end of the housing and on an associated part of said spider providing coacting clutch members each having external spline like teeth thereon, a clutch spring in said coacting clutch members for clutching them together in a relative rotative movement in one direction, means surrounding said coacting clutch members and having internal spline like teeth thereon and which means is longitudinally shiftable to engage its teeth with the teeth on both of said clutch members to connect them together independent of said spring.

10. In a gearing of the kind described, a ring gear housing, a differential pinion spider axially in the housing, means at one end of the housing and on an associated part of the spider providing coacting clutch members, means in said clutch members operating upon a relative rotation therebetween in one direction to clutch said members together, a ring normally surrounding said clutch member on the housing and longitudinally shiftable to connect both clutch members together independent of the means in said clutch members, longitudinally shiftable means associated with the other end of said housing and means connecting said longitudinally shiftable means with said ring for moving the same to connect said clutch members together independent of said means in said clutch members.

11. In a gearing of the kind described, a ring gear housing, a differential pinion spider axially in the housing, means at one end of the housing and on an associated part of the spider providing coacting clutch members, means in said clutch members operating upon a relative rotation therebetween in one direction to clutch said members together, a ring normally surrounding said clutch member on the housing and longitudinally shiftable to connect both clutch members together independent of the means in said clutch members, longitudinally shiftable means associated with the other end of said housing and rods journalled in parts of said housing and connecting said longitudinally shiftable means with said ring for moving the latter to connect said clutch members together independent of said means in said clutch members.

12. In a gearing of the kind described, a differential casing, a ring gear supporting housing therein, a differential pinion spider in said housing, means on one end of said housing and spider respectively providing coacting clutch members, means associated with said clutch members and operating in a relative rotation thereof in one direction to clutch said members together, a ring surrounding said members and longitudinally shiftable to lock said members together independent of said clutching means, a collar surrounding the other end of the housing and connected to said ring and a yoke pivoted in the casing and operatively engaged with said collar for imparting movement thereto.

13. In a gearing of the kind described, a differential casing, a ring gear supporting housing therein, a differential pinion spider in said housing, means on one end of said housing and spider respectively providing coacting clutch members, means associated with said clutch members and operating in a relative rotation thereof in one direction to clutch said members together, a ring surrounding said members and longitudinally shiftable to lock said members together independent of said clutching means, a collar surrounding the other end of the housing and connected to said ring, and a yoke pivoted in said casing and partially surrounding said last mentioned end of the housing and including arms operatively engaged with diametrically opposite sides of said collar for imparting movement thereto.

14. In a gearing of the kind described, a differential casing, a ring gear supporting housing therein, a differential pinion spider in said housing, means on one end of said housing and spider respectively providing coacting clutch members, means associated with said clutch members and operating in a relative rotation thereof in one direction to clutch said members together, a ring surrounding said members and longitudinally shiftable to lock said members together independent of said clutching means, a collar surrounding the other end of the housing and connected at one end to said ring and having an annular groove in the other end and a yoke pivoted in the casing and partially surrounding said last mentioned end of the housing and including arms carrying parts engaged in said groove of the collar to impart a shifting movement thereto.

15. In a gearing of the kind described, a differential casing, a driving member in said casing, a differential pinion spider also in said casing, means providing an overrunning clutch between said member and spider, a shiftable ring associated with said member and spider for locking them together independent of said clutch, means for imparting shifting movement to said ring, a rod forming a part of a transmission extending into said casing and also longitudinally shiftable and means connecting said rod with said shifting movement imparting means and including a lost motion providing device whereby said rod is capable of imparting movement to said ring when said rod is shifted in one direction, only.

HERBERT C. SNOW.
GEORGE W. HARPER.